(12) United States Patent
Steffanut et al.

(10) Patent No.: US 10,920,069 B2
(45) Date of Patent: Feb. 16, 2021

(54) USE OF AN ADDITIVE COMPOSITION FOR THE PREPARATION OF POLYCONDENSATION POLYMERS

(71) Applicant: CLARIANT PLASTICS & COATINGS LTD, Muttenz (CH)

(72) Inventors: Pascal Steffanut, Village-Neuf (FR); Mohamed Sidqi, Brunstatt (FR); Ernesto Dongiovanni, Horbourg-Wihr (FR); Jerome Abrahmi, Barcelona (ES)

(73) Assignee: Clariant Plastics & Coatings Ltd, Muttenz (CH)

( * ) Notice: Subject to any disclaimer, the term of this patent is extended or adjusted under 35 U.S.C. 154(b) by 0 days.

(21) Appl. No.: 16/313,234

(22) PCT Filed: Jun. 12, 2017

(86) PCT No.: PCT/EP2017/064214
§ 371 (c)(1),
(2) Date: Dec. 26, 2018

(87) PCT Pub. No.: WO2018/001704
PCT Pub. Date: Jan. 4, 2018

(65) Prior Publication Data
US 2019/0161609 A1 May 30, 2019

(30) Foreign Application Priority Data

Jun. 27, 2016 (EP) .................................. 16176384

(51) Int. Cl.
*C08L 67/00* (2006.01)
*C08K 5/3435* (2006.01)
*C08K 5/526* (2006.01)
*C08K 5/5393* (2006.01)
*C08G 69/16* (2006.01)
*C08G 63/00* (2006.01)
*C08L 77/00* (2006.01)

(52) U.S. Cl.
CPC .............. *C08L 67/00* (2013.01); *C08G 63/00* (2013.01); *C08G 69/16* (2013.01); *C08K 5/3435* (2013.01); *C08K 5/526* (2013.01); *C08K 5/5393* (2013.01); *C08L 77/00* (2013.01)

(58) Field of Classification Search
None
See application file for complete search history.

(56) References Cited

U.S. PATENT DOCUMENTS

| 4,075,163 A | 2/1978 | Hofer et al. |
| 6,063,843 A | 5/2000 | Sidqi et al. |
| 2004/0051088 A1 | 3/2004 | Schlosser et al. |

| 2016/0009918 A1* | 1/2016 | Hoerold | C08K 13/04 524/103 |
| 2019/0071549 A1* | 3/2019 | Koshi | B32B 27/34 |

FOREIGN PATENT DOCUMENTS

| EP | 0903372 A1 | 3/1999 |
| EP | 2634211 A1 | 9/2013 |
| WO | 97/43335 A1 | 11/1997 |
| WO | 2004/000921 A1 | 12/2003 |
| WO | 2007/128715 A1 | 11/2007 |

OTHER PUBLICATIONS

International Search Report and Written Opinion dated Jul. 19, 2017, issued in corresponding International Patent Application No. PCT/EP2017/064214.

* cited by examiner

*Primary Examiner* — Robert T Butcher
(74) *Attorney, Agent, or Firm* — Morgan, Lewis & Bockius LLP

(57) ABSTRACT

The present invention relates to the use of an additive composition for the preparation of polycondensation polymers wherein the additive combination is present in the polycondensation reaction and wherein the additive combination comprises one or more compounds of the formula (A) wherein $R_{11}$, $R_{12}$, $R_{13}$, $R_{14}$, $R_{15}$, $R_{16}$, $R_{17}$, and $R_{18}$ are independently selected from the group consisting of methyl, ethyl, propyl, isopropyl, butyl, isobutyl, tert.-butyl, linear or branched pentyl, linear or branched hexyl, linear or branched heptyl, linear or branched octyl or linear and branched nonyl groups, and $R_{21}$ and $R_{22}$ are independently selected from the group consisting of hydrogen, methyl, $O(C_1\text{-}C_6\text{-Acyl})$ and $O-R_3$, wherein $R_3$ is selected from the group consisting of methyl, ethyl, propyl, isopropyl, butyl, isobutyl, tert.-butyl linear or branched pentyl, linear or branched hexyl, linear or branched heptyl, linear or branched octyl or linear and branched nonyl groups, and one or more sterically hindered organic phosphorous(lll) compounds selected from the group consisting of sterically hindered phenyl phosphonites and sterically hindered phosphites.

(A)

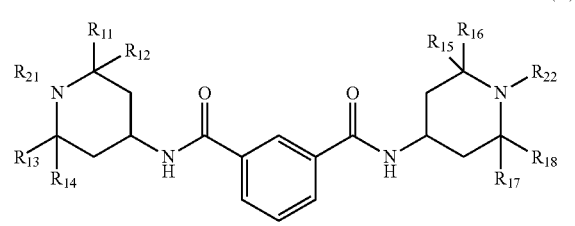

11 Claims, No Drawings

USE OF AN ADDITIVE COMPOSITION FOR THE PREPARATION OF POLYCONDENSATION POLYMERS

The present invention relates to the use of an additive composition for the preparation of polycondensation polymers and in particular of polyamides.

Polyamides (PAs) are high-molecular-weight materials containing amide units; the hydrocarbon segments between the amide groups can be aliphatic, partially aromatic, or wholly aromatic. The type of hydrocarbon segment used has an effect on the chain flexibility and structural regularity; this is important for the formation of the crystalline phase. Polyamides, in common with polypeptides, contain an amide group and are often called Nylons, the trade name given to them by DuPont.

Polyamides can be divided into polymers synthesized from diamines and diacids, called AA-BB-type polymers and polymers based on amino acids, called AB-type polymers. Polymers are further defined based on the number of carbon atoms they contain. Thus, the PA based on 1,6-hexamethylene diamine and adipic acid is named PA-6,6 and the polymer based on caprolactam, PA-6. The first use of PAs was in fibre applications, in which fibres were produced by melt spinning. These materials have a high strength and good wear resistance and can be easily dyed. The tension stiffening effect of the PA melt made the production of fibres with homogeneous thickness possible.

Polyamides as engineering plastics came onto the market following the development of the injection-molding machine, and most PAs as engineering plastics are processed by this method. The major part of polyamides as engineering plastics is either a reinforced or a rubber-modified grade. The glass-fibre filled polyamides have a high modulus, high strength, and good dimensional stability up to their melting temperature. These PAs are used in highly demanding applications such as in the transport sector "under the hood," in housing for electrical equipment, and in sporting goods.

PA-66 is still often synthesized in a one-pot batch process with a pre-polymerization stage under pressure. Continuous processes have long been described, and for pre-polymerization, in particular, they seem to work well. PA-6 can be synthesized in a continuous process at atmospheric pressure, but reaction times are very long as the ring-opening initiation step is particularly slow. The reaction time can be shortened considerably by carrying out pre-polymerization in the presence of excess water at pressure; however, this makes the continuous polymerization process more complex.

On the chemical point of view, these polyamides are obtained either by reaction between two different monomers (PA-66) or by polycondensation of a single monomer (PA 6). In the case of poly(hexamethylene adipamide), the main monomers are hexamethylenediamine and adipic acid. These monomers may be combined with up to 25 mol % of other diamine or diacid monomers or even amino acid or lactam monomers to modify the end properties of the final copolymer. For polyamides resulting from a single monomer, the most important polyamide of which is polycaprolactam. Of course, this polyamide can also be modified by mixing different lactams and/or amino acids. In the simplest case of polycaprolactam, the main monomer is caprolactam.

The class of polyamides resulting from two different monomers is generally manufactured by using, as starting material, a salt obtained by mixing a diacid with a diamine in stoichiometric amount, generally in a solvent, such as water. Thus, in the manufacture of poly(hexamethylene adipamide), adipic acid is mixed with hexamethylenediamine, generally in water, to produce hexamethylenediammonium adipate, better known under the name of Nylon salt or "N salt". The solution of the N salt is optionally concentrated by partial or complete evaporation of the water.

The class of polyamides resulting from a single monomer is generally manufactured by using, as starting material, a lactam and/or an amino acid, and a small amount of water; the proportion by weight of water is generally between 1 and 15%. The polyamide is obtained by heating, at high temperature and high pressure, an aqueous solution of the monomers (for example, a solution of Nylon salt as described above) or a liquid comprising the monomers, in order to evaporate the water while avoiding any formation of solid phase so as to prevent the mixture from setting solid.

WO 2007/128715 discloses a process for controlling and improving the dyeability and the dyeing process of polyamide-6 fibers.

WO 97/43335 discloses a processing stabilizer for polyamide polymers having the following structure:

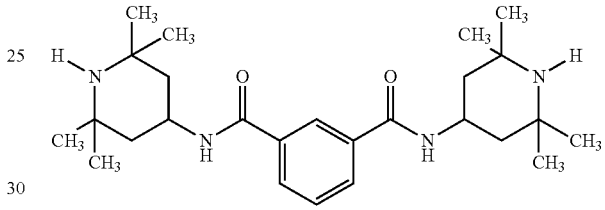

Said processing stabilizer can increase the heat-stability, light stability, chemical stability and dye affinity of a polyamide polymer.

EP 0 903 372 discloses a melt-processing process for polyamide polymers. During said process the polyamide polymers are stabilized against the damage effect by light, heat and/or oxidation by incorporation of an additive composition under melt processing conditions with polyamide polymer.

Several additives like surfactants, silicones, UV absorbers, light stabilizers or reactive compounds like acids or amines may be introduced to the polymerization step to modify the end properties of the targeted polyamide or to facilitate the poly-condensation or the polymerization process. Reactive compounds that are used as chain regulating agents, reacting with amino end groups, are usually acetic acid, benzoic acid, terephthalic acid or isophthalic acid. On the other hand, amino-based chain regulation agents are from the group composed of 3-(dialkylamino)-1-propylamines, 2-(dialkylamino)-1-ethylamines, piperidino- and pyrrolidino-alkylamines and aromatic bis-hindered amine diamides (as Nylostab® S-EED from Clariant). In addition to their positive effects on the mechanical and chemical properties of the end polymers, these chain terminating groups may also impact negatively the reaction kinetics.

Therefore there is a strong unmet need, in the polycondensation industry to reduce further the poly-condensation time while still improving the overall qualities of the end product.

The problem of the present invention is to provide an additive combination which significantly reduces the time of the polycondensation reaction and while improving or at least maintaining the overall performance qualities of the end product.

The problem is solved by the use of an additive combination for the preparation of polycondensation polymers wherein the additive combination is present in the polycondensation reaction and
wherein the additive combination comprises one or more compounds of the formula (A)

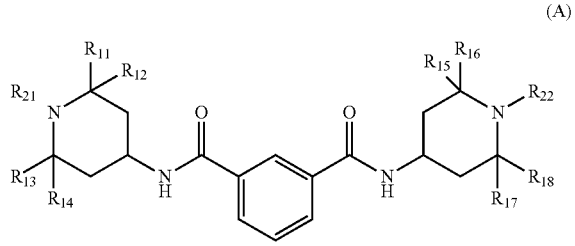

(A)

wherein
$R_{11}$, $R_{12}$, $R_{13}$, $R_{14}$, $R_{15}$, $R_{16}$, $R_{17}$, and $R_{18}$ are independently selected from the group consisting of methyl, ethyl, propyl, isopropyl, butyl, isobutyl, tert.-butyl, linear or branched pentyl, linear or branched hexyl, linear or branched heptyl, linear or branched octyl or linear and branched nonyl groups, and
$R_{21}$ and $R_{22}$ are independently selected from the group consisting of hydrogen, methyl, $O(C_1$-$C_6$-Acyl) and $O$—$R_3$, wherein $R_3$ is selected from the group consisting of methyl, ethyl, propyl, isopropyl, butyl, isobutyl, tert.-butyl linear or branched pentyl, linear or branched hexyl, linear or branched heptyl, linear or branched octyl or linear and branched nonyl groups, and
one or more sterically hindered organic phosphorous(III) compounds selected from the group consisting of sterically hindered phenyl phosphonites and sterically hindered phosphites, and wherein
the additive combination comprises 85% to 99.99% by weight, preferably 90% to 99.9% by weight, most preferably 92% to 98% by weight, particularly preferably 95% to 98% by weight of the aromatic dicarbonyl (ester) amide compounds of the formula (A) and 0.01% to 15% by weight, preferably 0.1% to 10% by weight, most preferably 2% to 8% by weight, particularly preferably 2% to 5% by weight of the one or more sterically hindered organic phosphorous (III) compounds, preferably phenyl phosphonites of the formula (B).

It is expedient that the additive combination of the present invention is present in the polycondensation reaction mixture before the polymerization reaction starts, in particular before the reaction temperature is higher than 100° C.

The one or more aromatic dicarbonyl (ester) amide compound of the formula (A) and one or more sterically hindered organic phosphorous(III) compound can be added separately from each other and/or can be added as an additive mixture at the beginning of the reaction to the monomers before carrying out the polymerization reaction.

The present invention also involves a method for preparing a polycondensation polymer by adding the additive combination to the polycondensation reaction mixture before the polymerization reaction starts, in particular before the reaction temperature is higher than 100° C.

The reaction conditions for carrying out standard polyamide or polyester synthesis are known to those skilled in the art.

Preferred organic phosphorous(III) compounds are sterically hindered phenyl phosphonites.

Particularly preferred phenyl phosphonites are compounds of the formula (B)

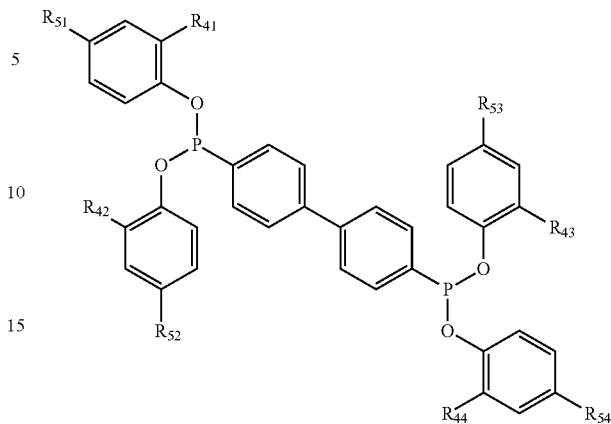

(B)

wherein
each $R_{41}$, $R_{42}$, $R_{43}$, $R_{44}$, $R_{51}$, $R_{52}$, $R_{53}$ and $R_{54}$, are independently selected from the group consisting of methyl, ethyl, propyl, isopropyl, butyl, isobutyl, tert.-butyl linear or branched pentyl, linear or branched hexyl, linear or branched heptyl, linear or branched octyl or linear branched nonyl, and cumyl groups.

Preferably, the sterically hindered phenyl phosphonite of the formula (B) comprises four identical phenyl groups. That is, the residues $R_{41}$, $R_{42}$, $R_{43}$, $R_{44}$ are all the same and $R_{51}$, $R_{52}$, $R_{53}$ and $R_{54}$ are all the same as well. Beside the outstanding effect on the end product, said compounds of the formula (B) have the advantage that they can be produced in an easy and cheap manner.

Preferably, the sterically hindered phenyl phosphonite of the formula (B) in the additive composition according to the present invention is

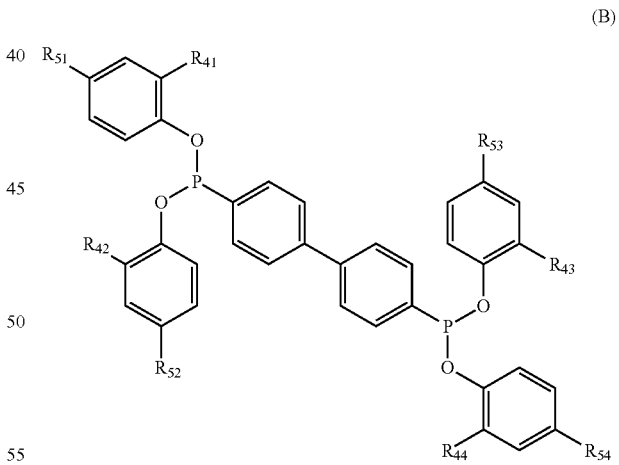

(B)

wherein
$R_{51}$, $R_{52}$, $R_{53}$ and $R_{54}$ are all tert-butyl groups and $R_{41}$, $R_{42}$, $R_{43}$, $R_{44}$ are all methyl or tert-butyl groups, preferably tert-butyl groups.

Preferably, the sterically hindered phenyl phosphonite contains a mixture of the condensation products of sterically hindered alkyl phenols, such as 2,4-di-tertiary butyl phenol, with the Friedel-Crafts reaction product of diphenyl and $PCl_3$. The condensation products of 2,4-di-tertiary butyl phenol are particularly preferred. They are described for example in U.S. Pat. No. 4,075,163, the disclosure of which, particularly column 1, line 13 to column 4, line 9 and Example 12, is incorporated herein by reference. Said condensation products comprise inter alia tetrakis(2,4-di-tert.-butylphenyl)biphenylene diphosphonite (compound of the formula B1), bis(2,4-di-tert.-butylphenyl)biphenylene monophosphonite, and tris(2,4-di-tert.-butylphenyl)phosphite; 2,4-di-tert.-butylphenol.

The most preferred sterically hindered phenyl phosphonite is the compound of the formula (B1)

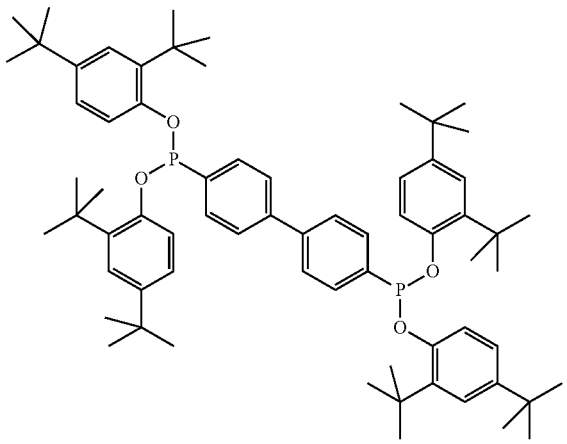

(B1)

Said compound of the formula (B1) is the main component of the commercially available product Hostanox® P-EPQ from Clariant.

Examples of sterically hindered phosphites are compounds of formula (C), (D) and (E)

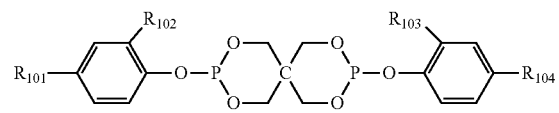

(C)

wherein
$R_{101}$, $R_{102}$, $R_{103}$, $R_{104}$, are independently selected from the group consisting of methyl, ethyl, propyl, isopropyl, butyl, isobutyl, tert.-butyl, linear or branched pentyl, linear or branched hexyl, linear or branched heptyl, linear or branched octyl or linear and branched nonyl groups and cumyl.

Compound of formula (D) is

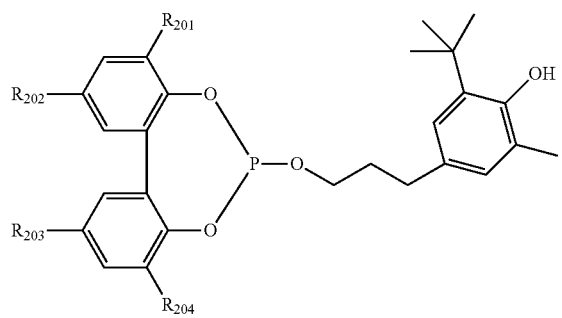

(D)

wherein
$R_{201}$, $R_{202}$, $R_{203}$, $R_{204}$, are independently selected from the group consisting of methyl, ethyl, propyl, isopropyl, butyl, isobutyl, tert.-butyl, linear or branched pentyl, linear or branched hexyl, linear or branched heptyl, linear or branched octyl or linear and branched nonyl groups and cumyl.

Compound of formula (E) is

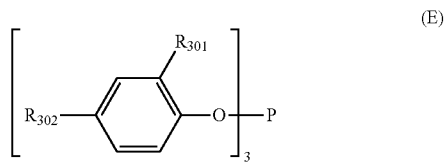

(E)

wherein
$R_{301}$, $R_{302}$, $R_{303}$ are independently selected from the group consisting of methyl, ethyl, propyl, isopropyl, butyl, isobutyl, tert.-butyl, linear or branched pentyl, linear or branched hexyl, linear or branched heptyl, linear or branched octyl or linear and branched nonyl groups and cumyl.

Preferred are the compounds of formula (C1), (D1) and (E1):

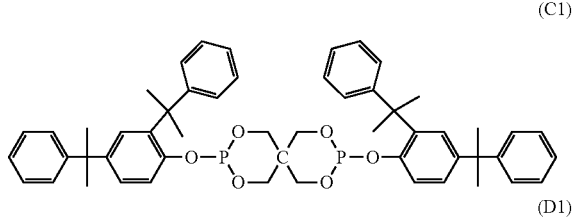

(C1)

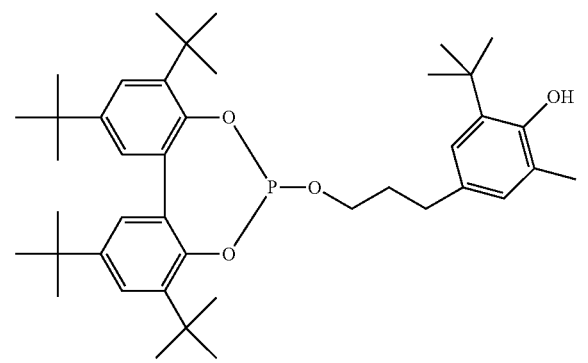

(D1)

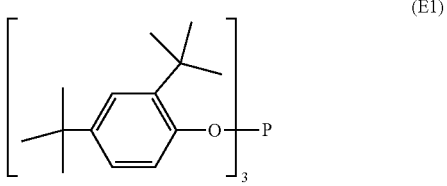

(E1)

It could be shown that a combination of said two types of components, that is, the one or more aromatic dicarbonyl (ester) amide compounds of the formula (A) and the one or more sterically hindered organic phosphorous(III) compound significantly reduces the reaction time of the polymer preparation significantly due to their synergistic chain-regulating and catalytic characteristics in the polycondensation reaction. The additive combination according to the present invention exhibits significant technical and economic advantages in the polycondensation steps, even at low effective concentrations. In fact, the additive combination according to the present invention allows to reduce the reaction time by 20 to 30% having at the same time a proper balance between amino end groups (AEG) and carboxylic end group (CEG) which results in good dye-affinity. In addition, the additive composition according to the present invention provides polyamides with good mechanical, color, thermal and light stabilities.

Preferably, the additive combination according to present invention comprises one aromatic dicarbonyl (ester) amide compound of the formula (A) and one sterically hindered phenyl phosphonite of the formula (B). Such an additive combination acts synergistically on the reaction kinetics. Good results could also be obtained by the additive combination according to present invention comprising one aromatic dicarbonyl (ester) amide compound of the formula (A) and two or more, preferably two or three, most preferably two sterically hindered phenyl phosphonites of the formula (B).

Preferably, the aromatic dicarbonyl (ester) amide compound of the formula (A) comprises two identical piperidine groups. That is $R_{21}$ and $R_{22}$ are the same and $R_{11}$ corresponds $R_{15}$, $R_{12}$ corresponds $R_{16}$, $R_{13}$ corresponds $R_{17}$ and $R_{14}$ corresponds $R_{18}$. Beside the outstanding effect on the end product, said compounds of the formula (A) have the advantage that they can be produced in an easy and cheap manner.

Preferably, the aromatic dicarbonyl (ester) amide compound of the formula (A) in the additive composition according to the present invention is

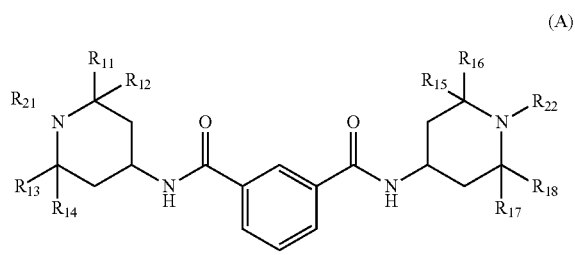

(A)

wherein
$R_{21}$ and $R_{22}$ are both hydrogen and $R_{11}$, $R_{12}$, $R_{13}$, $R_{14}$, $R_{15}$, $R_{16}$, $R_{17}$, and $R_{18}$ are all methyl or ethyl, preferably methyl.

Preferably, the aromatic dicarbonyl (ester) amide is a compound of the formula (A1)

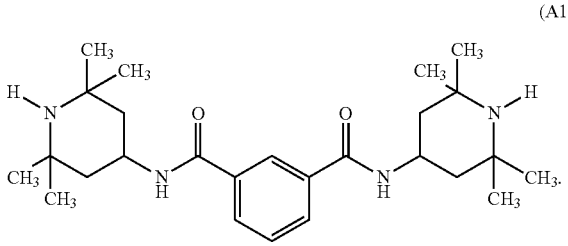

(A1)

Said compound of formula (A1) (N,N'-bis(2,2,6,6-tetramethyl-4-piperidinyl)-1,3-benzenedicarboxamide) is commercially available as NYLOSTAB® S-EED from Clariant. Additive compositions according to the present invention comprising compound of formula A1 as aromatic dicarbonyl (ester) amide show a particular high productivity and a reduced cycle time for injection molding processes. In addition, a long term heat and UV/light stability could be observed.

Most preferably the additive combination according to the present invention comprises the compound of the formula (A1)

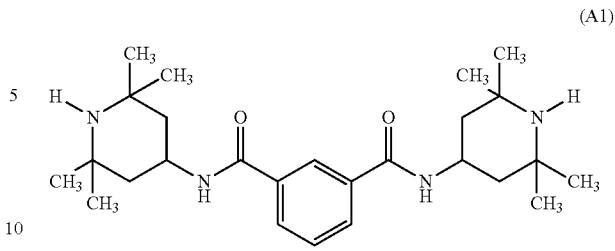

(A1)

and the compound of the formula (B1)

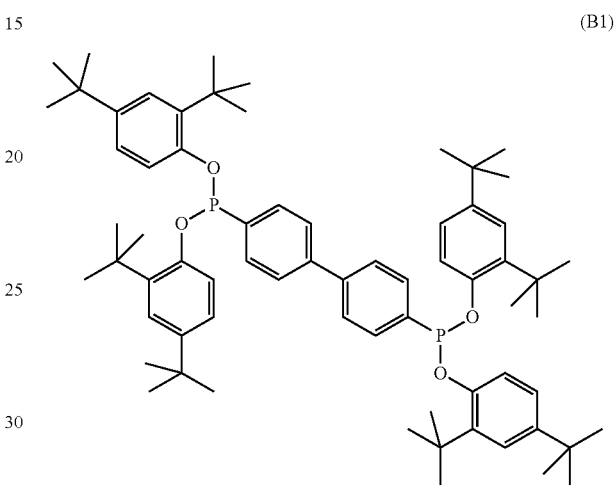

(B1)

In particular, an additive combination comprises from 92 to 98% by weight of the aromatic dicarbonyl (ester) amide compounds of the formula (A1) and preferably from 2 to 8% by weight of sterically hindered phenyl phosphonite of the formula (B1), resulting in outstanding polycondensation kinetics as well as a good mechanical stability.

The additive combination according the present invention is used for the production of polycondensation polymers such as polyamides or polyesters. The term polyamides includes the production of aliphatic, semi-aromatic or aromatic polyamides and the term polyesters includes the production of aliphatic, semi-aromatic or aromatic polyesters. Possible polyesters are for example polyethylene terephthalate (PET), polybutylene terephthalate (PBT), polycarbonate (PC), polylactic acid (PLA), polytrimethylene terephthalate (PTT), polyethylene naphthalate (PEN), Vectran (Polycondensation of 4-hydroxybenzoic acid and 6-hydroxynaphthalene-2-carboxylic acid), polybutylene succinate (PBS), and polyglycolide or polyglycolic acid (PGA).

Preferably, the additive combination is used for the production of polyamides selected from the group consisting of polyamide 6, polyamide-6.6, polyamide-6.10, polyamide 6.11, polyamide-6.12, polyamide 11, polyamide 12, polyamide-6.6/6 copolymer, polyamide-6.6/6.10 copolymer, 6/11 copolymer, 6/12 copolymer, polyether-polyamide block copolymers, poly(m-phenyleneisophthalamide) and poly(p-phenyleneterephthalamide). Most preferably it is used for the production of polyamide 6 and/or polyamide 6.6.

Expediently, the total amount of the additive combination used according to the present invention is from 0.01 to 10 weight percent, preferably from 0.05 to 5 weight percent, more preferably from 0.1 to 1.0 weight percent, most preferably from 0.1 to 0.5 weight percent, relative to the weight of the polycondensate, e.g. polyamide or polyester, prepared.

Preferably, the additive combination according to the present invention is used in the presence of an acid. It was found that the presence of an acid positively influences the chain stopping system and thermal stability. Said acid may be an aromatic or a non-aromatic acid, which may be a mono-acid or a di-acid. Preferred acids are selected from the group consisting of acetic acid, adipic acid, paraterephthalic acid, isophthalic acid and benzoic acid or a mixture thereof. Expediently, the total amount of the acid is from 0.01 to 5 weight percent, preferably from 0.01 to 3 weight percent, more preferably from 0.01 to 1 weight percent, most preferably from 0.01 to 0.5 weight percent, relative to the weight of the polycondensate, e.g. polyamide or polyester, prepared.

Conventional additives that are known to be possibly incorporated at the polymerization or the polycondensation steps may optionally be present during the process like for example, primary thermal stabilizers, light stabilizers, lubricants, pigments, reinforcing and/or non-reinforcing fillers.

Thereafter, the pellets are dried at 80° C. under vacuum for 24 hours and samples of the obtained material analysed. The polymer is analysed by conventional analytical methods as shown in Table 2.

Additive composition 1, 2, and 3: compound of formula (A1)+compound of formula (B1) in different relative proportions as listed in Table 1

TABLE 1

RT (reaction time in min) of different composition of A1 and B1

| No. | Formulation | A1 (weight %) | B1 (weight %) | RT (min) |
|---|---|---|---|---|
| 0 | PA-6 (reference) | — | — | 100 |
| 1 | Composition 1 | 95.0 | 5.0 | 80 |
| 2 | Composition 2 | 91.0 | 9.0 | 90 |
| 3 | Composition 3 (comp) | 83.0 | 17.0 | 100 |

Composition 1 shows the optimum reaction time.

TABLE 2

Polyamide-6 chips characterization.

| No. | Formulation | RT | RV | AEG (meq/kg) | CEG (meq/kg) | YI (DIN 6174) |
|---|---|---|---|---|---|---|
| 1 | PTA (comp.) | 100 | 1.76 | 32 | 78 | 37 |
| 3 | PTA/Nylostab S-EED (comp.) | 100 | 1.76 | 39 | 81 | 36 |
| 4 | PTA/Additive comp. 1 | 80 | 1.79 | 40 | 78 | 34 |
| 5 | PTA/Additive comp. 1/ Benzylamine | 80 | 1.76 | 42 | 69 | 35 |
| 6 | PTA/Additive comp. 1/ Hostavin N30 | 80 | 1.77 | 33 | 72 | 38 | comp.: comparative example
RT: reaction time in min
RV: relative viscosity
AEG: Amino End Group
CEG: Carboxylic End Group
Color YI: DIN 6174
PTA: paraterephthalic acid

EXAMPLES

Polymerization speed (RT/min) has been measured in comparison to the state-of-the art existing chain stopping systems taken as market reference (based on paraterephthalic acid).

Polyamide chips have been characterized in terms of Color, Relative Viscosity (RV), Amino End Groups (AEG) and Carboxylic End Groups (CEG).

Amino End Groups (AEG) and Carboxylic End Groups (CEG) were determined using acid/base titration.

RV was measured using capillary viscometric analysis with a 50/50 by weight mixture of phenol/orthodichlorobenzene at 25° C.

Typical example for the polymerization of caprolactam:

In the batch wise process, caprolactam is molten with a small amount of water (less than 2 wt.-%) at a starting temperature of about 80-85° C. The chain stopping and catalytic formulations 1 to 6 (Table 2) are then added (0.28% acid, 0.1% composition, 0.05%-0.1% amine) to the mixture. After 8 hours of stirring at 80-85° C., the solution is heated at higher temperature (250-260° C.) until the desired molecular weight is achieved. The finished polymer is then granulated and the pellets extracted with a Soxlhet for 24 hours.

TABLE 3

Color measurement (YI) after thermal treatment at 200° according to DIN 6174

| No. | Formulation | 1 (min) | 5 (min) | 10 (min) |
|---|---|---|---|---|
| 3 | PTA/Nylostab S-EED (comp.) | 0.8 | 12.05 | 19.18 |
| 4 | PTA/Composition 1 | 0.2 | 6.0 | 11.6 |

The tested specimens were prepared as follows. The different polyamide pellets were formed into panels 1 mm thick by injection molding at temperatures of from 280 to 300° Celsius, followed by either punching of the tested samples to 35 mm×40 mm or by direct injection molding of tensile bar specimens.

The color determination is reported in terms of the Yellowness Index (YI) determined in accordance with the ASTM E-313 Yellowness Test. The higher the value, the lower the color quality.

In addition, the color is measured according to the regulations of the CIE (International Commission on Illumination) and in accordance with the ISO 7724/3 and DIN 6174 standards. The higher the positive value of b*, the more pronounced the yellowing.

The invention claimed is:

1. A process for preparing a polycondensation polymer, the process comprising preparing the polycondensation polymer from a polycondensation reaction of monomers wherein an additive combination is present in the polycondensation reaction,
wherein the additive combination comprises one or more compounds of the formula (A)

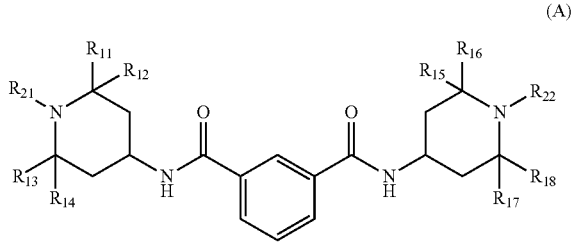

(A)

wherein
$R_{11}$, $R_{12}$, $R_{13}$, $R_{14}$, $R_{15}$, $R_{16}$, $R_{17}$, and $R_{18}$ are independently selected from the group consisting of methyl, ethyl, propyl, isopropyl, butyl, isobutyl, tert.-butyl, linear or branched pentyl, linear or branched hexyl, linear or branched heptyl, linear or branched octyl or linear and branched nonyl groups, and
$R_{21}$ and $R_{22}$ are independently selected from the group consisting of hydrogen, methyl, $O(C_1$-$C_6$-Acyl) and O—$R_3$, wherein $R_3$ is selected from the group consisting of methyl, ethyl, propyl, isopropyl, butyl, isobutyl, tert.-butyl linear or branched pentyl, linear or branched hexyl, linear or branched heptyl, linear or branched octyl or linear and branched nonyl groups, and
one or more sterically hindered organic phosphorous(III) compounds of formula (B)

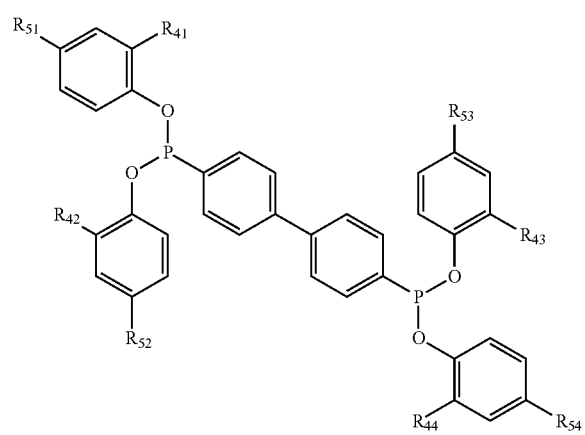

(B)

wherein
each $R_{41}$, $R_{42}$, $R_{43}$, $R_{44}$, $R_{51}$, $R_{52}$, $R_{53}$ and $R_{54}$, are independently selected from the group consisting of methyl, ethyl, propyl, isopropyl, butyl, isobutyl, tert.-butyl linear or branched pentyl, linear or branched hexyl, linear or branched heptyl, linear or branched octyl or linear or branched nonyl, and cumyl groups, and wherein the additive combination comprises a proportion of from 95% to 98% by weight of the compounds of the formula (A) and 2% to 5% by weight of the sterically hindered organic phosphorous(III) compounds based on the total amount of the additive combination, and wherein the additive combination is used in the presence of an acid.

2. The process as claimed in claim 1, wherein the additive combination is present in the polycondensation reaction mixture before the polymerization reaction starts.

3. The process as claimed in claim 1, wherein the additive combination is present in the polycondensation reaction mixture before the reaction temperature is higher than 100° C.

4. The process as claimed in claim 1, wherein the polycondensation polymer is a polyamide or a polyester.

5. The process as claimed in claim 1, wherein the sterically hindered organic phosphorous(III) compounds are sterically hindered phenyl phosphonites.

6. The process as claimed in claim 1, wherein the sterically hindered organic phosphorous(III) compound is a compound of the formula (B1)

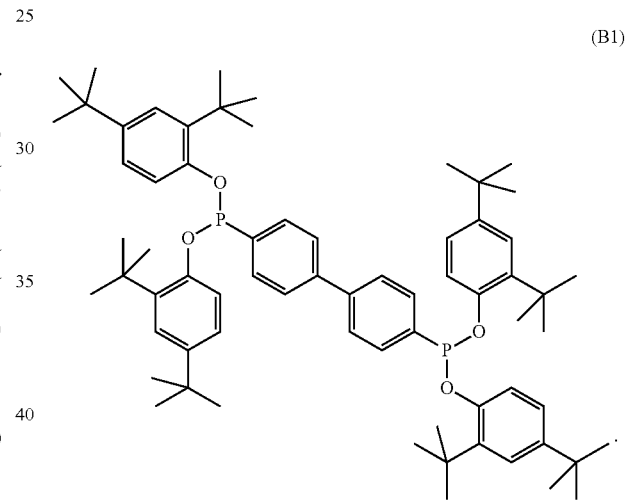

(B1)

7. The process as claimed in claim 1, wherein the compound of the formula (A) corresponds to formula (A1)

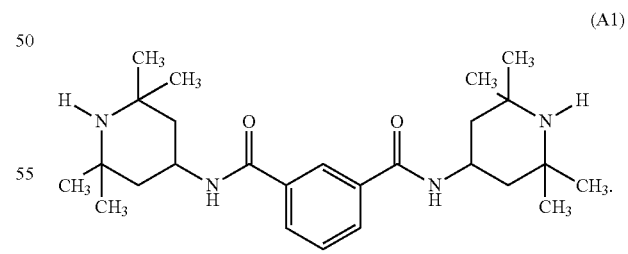

(A1)

8. The process as claimed in claim 1, wherein the additive combination is used in an amount of from 0.01 to 10 weight percent, relative to the weight of the polycondensation polymer prepared.

9. The process as claimed in claim 1, wherein the additive combination is used in an amount of from 0.1 to 0.5 weight percent, relative to the weight of the polycondensation polymer prepared.

10. The process as claimed in claim 1, wherein the acid is selected from the group consisting of acetic acid, adipic acid, paraterephthalic acid, isophthalic acid and benzoic acid or a mixture thereof.

11. The process as claimed in claim 1, wherein the total amount of the acid is from 0.01 to 5 weight percent, relative to the weight of the polycondensation polymer prepared.

* * * * *